United States Patent
Howell et al.

(10) Patent No.: US 8,226,042 B1
(45) Date of Patent: Jul. 24, 2012

(54) SPIN CONTROL SYSTEM FOR A SUSPENDED OBJECT THAT IS TO BE DEPLOYED IN OR RECOVERED FROM WATER

(75) Inventors: W. Scott Howell, Lynn Haven, FL (US); Thomas M. Pruitt, Panama City, FL (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 984 days.

(21) Appl. No.: 12/220,432

(22) Filed: Jul. 14, 2008

(51) Int. Cl.
*B64D 1/08* (2006.01)
(52) U.S. Cl. .................................................. 244/137.4
(58) Field of Classification Search ............... 244/137.4, 244/17.19; 114/23, 55.52, 151; 102/402
See application file for complete search history.

(56) References Cited

U.S. PATENT DOCUMENTS

| | | | | |
|---|---|---|---|---|
| 2,122,346 | A * | 6/1938 | Horn | 446/33 |
| 2,281,656 | A * | 5/1942 | Abernethy | 446/326 |
| 3,780,220 | A * | 12/1973 | Fugitt et al. | 348/81 |
| 3,880,103 | A * | 4/1975 | Talkington | 405/185 |
| 3,946,971 | A * | 3/1976 | Chadwick | 244/137.4 |
| 6,189,834 | B1 * | 2/2001 | Dietz et al. | 244/137.1 |
| 6,289,669 | B1 * | 9/2001 | Smirra | 60/229 |
| 6,951,317 | B2 * | 10/2005 | Woessner et al. | 244/3.22 |
| 7,032,860 | B1 * | 4/2006 | Kirk et al. | 244/17.19 |

FOREIGN PATENT DOCUMENTS

JP 61132497 * 6/1986 ............ 114/122

* cited by examiner

Primary Examiner — Tien Dinh
(74) Attorney, Agent, or Firm — James T. Shepherd

(57) ABSTRACT

A spin control system includes first and second thrusters coupled to an object hanging from a suspension member. When activated, the first and second thrusters generate thrust in opposing directions that are substantially perpendicular to the longitudinal axis of the suspension member. When the object spins, a controller activates at least one of the first and second thrusters to approximately align the object with a reference position.

15 Claims, 2 Drawing Sheets

SPIN CONTROL SYSTEM FOR A SUSPENDED OBJECT THAT IS TO BE DEPLOYED IN OR RECOVERED FROM WATER

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to control of suspended objects, and more particularly to a system that can control the spin of an object suspended from a non-rigid suspension member.

BACKGROUND OF THE INVENTION

Objects suspended in air by a rope, cable or any other non-rigid suspension member, have a tendency to spin about the longitudinal axis of the suspension member. Such "objects" can be those deployed/recovered from the water (e.g., an underwater vehicle, a person being rescued from the water by helicopter, etc.) or can be those conveyed on the land (e.g., a crane lifting a load for high-rise construction purposes). In either case, the spin of the suspended object can cause handling difficulties or hazardous conditions. Accordingly, when possible, a tag-line coupled to the suspended object is used by a ground-based person to prevent spin. However, suspended-object scenarios taking place over open water or on high-rises do not lend themselves to the use of tag-lines.

SUMMARY OF THE INVENTION

Accordingly, it is an object of the present invention to provide a spin control system for suspended objects.

Another object of the present invention is to provide a self-contained system that can control the spinning of an object suspended in air by a non-rigid suspension member.

Other objects and advantages of the present invention will become more obvious hereinafter in the specification and drawings.

In accordance with the present invention, a spin control system for a suspended object includes first and second thrusters. The first thruster is coupled to an object hanging from a suspension member. When activated, the first thruster generates thrust in a first direction that is substantially perpendicular to the longitudinal axis of the suspension member. The second thruster is also coupled to the object and is adjacent to the first thruster. When activated, the second thruster generates thrust in a second direction that is opposite the first direction while also being substantially perpendicular to the longitudinal axis of the suspension member. When the object spins, a controller activates at least one of the first and second thrusters to approximately align the object with a reference position.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
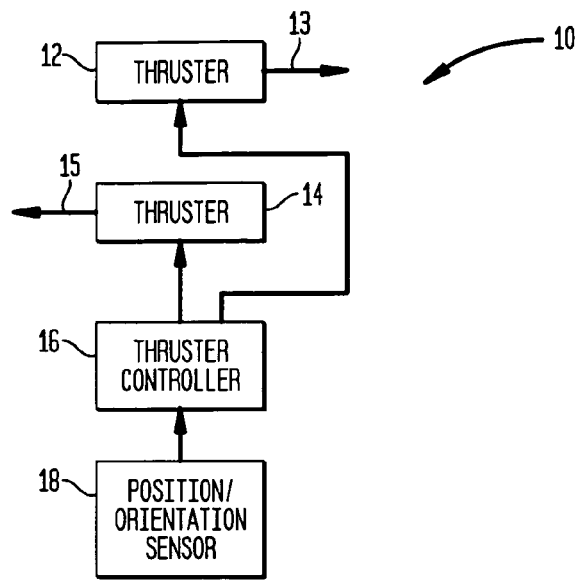
FIG. 1 is a schematic plan view of a suspended-object spin control system in accordance with the present invention.

Referring now to the drawings and more particularly to FIG. 1, a spin control system in accordance with the present invention is shown and is referenced generally by numeral 10. Spin control system 10 is to be coupled to an object (not shown in FIG. 1) that is suspended in air by means of a non-rigid suspension member (e.g., rope, line, cable, etc.). As would be understood in the art, an object so-suspended will have a tendency to spin about the longitudinal axis of the suspension member. Such spinning can be caused by one or more of weight imbalances of the object relative to the longitudinal axis of the suspension member, wind, slewing movement of the object, etc.

In general, the present invention uses two or more thrusters to counteract the spin of a suspended object. At a minimum, spin control system 10 includes a first thruster 12, a second thruster 14, a thruster controller 16, and a position/orientation sensor 18. For example, in the illustrated embodiment, thrusters 12 and 14 are positioned such that the thrust force generated by an activated thruster 12 is directed in a direction 13 that is opposite that of direction 15, i.e., the direction of the thrust force generated by an activated thruster 14. The activation of one or both of thrusters 12 and 14 is controlled by thruster controller 16. Position/orientation sensor 18 detects either a position or orientation of system 10 and provides same to thruster controller 16. Since system 10 is coupled to the suspended object, the position/orientation information detected by sensor 18 provides position/orientation information about the suspended object. Controller 16 uses the position/orientation information to activate/deactivate thrusters 12 and/or 14. Although not shown, it is to be understood that system 10 will typically include an onboard power source for powering the above-described components.

Figure 2:
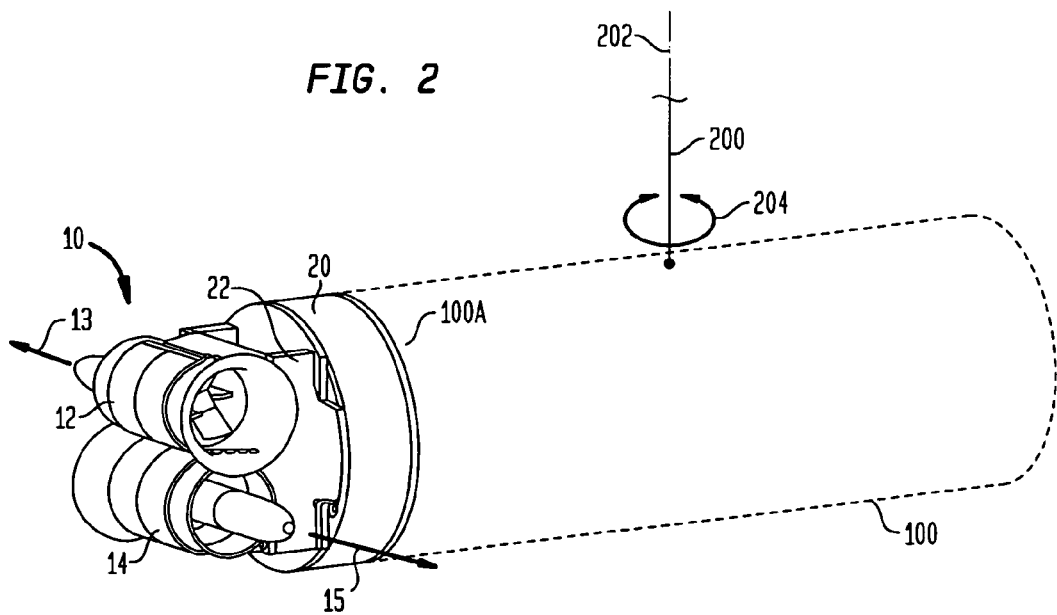
FIG. 2 is a perspective view of a self-contained, suspended-object spin control system coupled to a suspended object in accordance with an embodiment of the present invention.

To provide a clearer understanding of the present invention, an embodiment thereof will be explained with additional reference to FIG. 2. In FIG. 2, the illustrated embodiment of system 10 is coupled to an outboard end 100A of an object 100 that is suspended in air by means of non-rigid suspension member 200 that extends up to a support (not shown) such as a winch, crane, etc., the choice of which is not a limitation of the present invention. The weight of object 100 causes suspension member 200 to be placed in tension along the longitudinal axis 202 thereof. As is well known in the art, this scenario will tend to cause object 100 to spin about longitudinal axis 202 as indicated by two-headed rotational arrow 204.

In the illustrated embodiment, system 10 has a housing 20 that is coupled to outboard end 100A of object 100. Such coupling can be permanent (e.g., bolted) or temporary (e.g., magnetic) without departing from the scope of the present invention. Housing 20 contains and protects the various electronics components (e.g., controller 16, sensor 18, power source, etc.) of system 10 that are not shown in FIG. 2 to maintain clarity of illustration.

Mounted to housing 20 or integrated with housing 20 is a mounting support 22 for each of thrusters 12 and 14 which can be, for example, ducted fans. In the illustrated embodiment, housing 20/support 22 fixes the positions of thrusters 12 and 14 adjacent to one another with respective thrust directions 13 and 15 pointing in opposite directions. Housing 20/support 22 is configured and/or coupled to object 100 such that thrust directions 13 and 15 are substantially perpendicular to longitudinal axis 202 while lying in a plane that is substantially parallel to longitudinal axis 202. In this way, thrusters 12 and 14 can be controlled to counter spin 204. The greater the separation distance between longitudinal axis 202 and thrusters 12/14, the lower the force required to control spin 204.

In order to "know" which of thrusters 12 and 14 needs to be activated to counter spin 204, controller 16 needs a reference position or orientation. Depending on the application, such reference information can be predetermined/stored by controller 16, manually or remotely entered into controller 16 at time of use, or determined in-situ by system 10, without departing from the scope of the present invention. For example, an in-situ determination of position/orientation could be used in an embodiment of the present invention configured for an underwater recovery operation as illustrated in FIG. 3 where like reference numerals are used for the elements described earlier herein.

Figure 3:
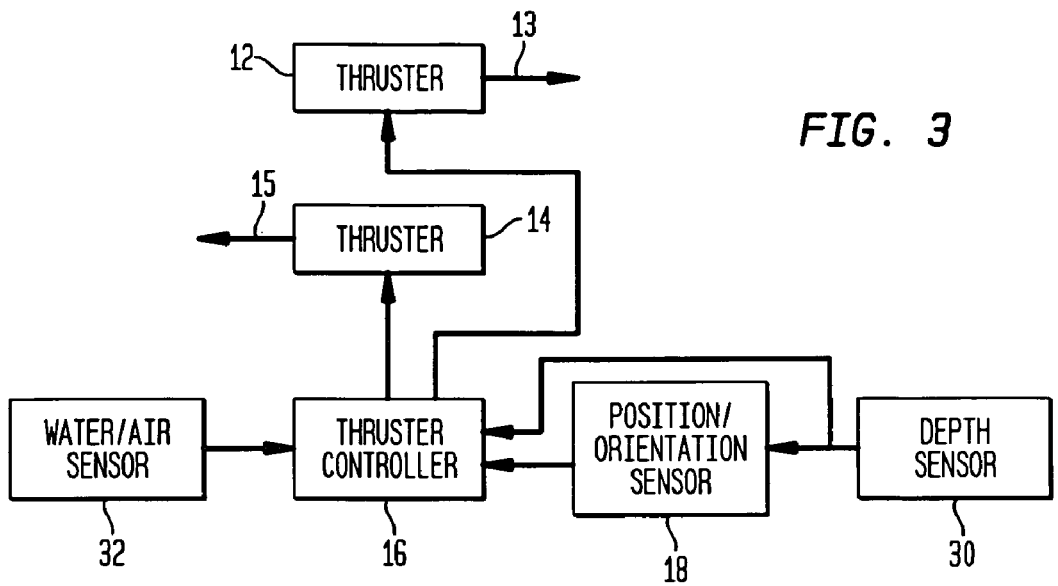
FIG. 3 is a schematic plan view of a suspended-object spin control system configured for an underwater vehicle recovery scenario in accordance with another object of the present invention.

The system illustrated in FIG. 3 can be used when an underwater vehicle (not shown) is being recovered from an in-air location (e.g., on a dock/platform, onboard a ship, from a helicopter, etc.). Typically, the underwater vehicle will be positioned in a desired orientation or heading just prior to recovery from the water. Accordingly, a depth sensor 30 can be used to supply a system activation signal to controller 16 and/or sensor 18 when a prescribed depth just below the water's surface is detected. It is to be assumed that the underwater vehicle is in its desired orientation for recovery at this depth. Accordingly, at this depth, the position/orientation detected by sensor 18 is used by controller 16 as the reference position that will govern the control of thrusters 12 and 14 as described above.

Since thrusters 12 and 14 will typically only be capable of in-air operation, the present invention's spin control will actually be implemented only after the underwater vehicle clears the water and is suspended by the recovery line. To insure this operational scenario, a water or air sensor 32 is used. The signal produced by sensor 32 can either be used to inhibit or enable thruster operation so that thrusters 12 and 14 are only activated in the air.

Figure 4:
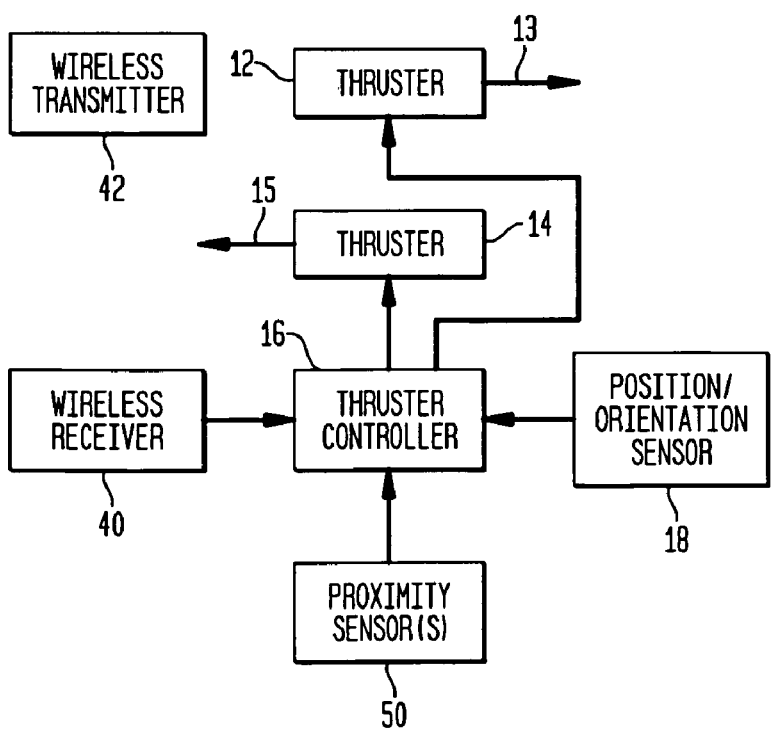
FIG. 4 is a schematic plan view of a suspended-object spin control central system that includes wireless control communication and proximity sensors in accordance with another embodiment of the present invention.

While the present invention can be configured as a completely self-contained system, other embodiments thereof are possible without departing from the scope of the present invention. For example, FIG. 4 illustrates another embodiment of the present invention where the system shown in FIG. 1 is further configured for wireless communication. More specifically, a wireless receiver 40 is coupled to controller 16 and a wireless transmitter 42 is provided for use at a remote location. Receiver 40/transmitter 42 can be configured to simply provide activation/deactivation of the spin control system, or can be configured to provide programming for controller 16. In addition, proximity sensor(s) 50 could be included and used to detect obstacles. The obstacle detection information could be provided to controller 16 so that thrusters 12 and 14 could be activated for autonomous obstacle avoidance.

The advantages of the present invention are numerous. Handling difficulties and/or dangerous conditions created by spinning suspended objects are eliminated by a simple, self-contained system. The present invention can be permanently attached/integrated into an object, or can simply be attached thereto when needed.

Although the invention has been described relative to a specific embodiment thereof, there are numerous variations and modifications that will be readily apparent to those skilled in the art in light of the above teachings. For example, three or more thrusters could be used to enhance spin control as the thrust direction(s) of the additional thruster(s) would be directed to increase the degrees of freedom of the control movements. It is therefore to be understood that, within the scope of the appended claims, the invention may be practiced other than as specifically described.

What is claimed as new and desired to be secured by Letters Patent of the United States is:

1. A spin control system, comprising:
at least two thrust producing means to include a first thrust producing means and a second thrust producing means, said first thrust producing means adapted to be coupled to an object hanging from a suspension member wherein the object is subject to spinning about a longitudinal axis of the suspension member and wherein, when activated, said first thrust producing means generates thrust in a first direction that is substantially perpendicular to the longitudinal axis of the suspension member;
said second thrust producing means adapted to be coupled to the object adjacent to said first thrust producing means wherein, when activated, said second thrust producing means generates thrust in a second direction that is opposite said first direction and substantially perpendicular to the longitudinal axis of the suspension member;
a controller coupled to said first thrust producing means and said second thrust producing means for activating at least one of said first thrust producing means and said second thrust producing means to approximately align the object with a reference position; and
a sensor coupled to said controller for generating signal when said sensor is in water wherein, in response to said signal, said controller inhibits activation of said first thrust producing means and said second thrust producing means in water.

2. A spin control system as in claim 1 further comprising a position/orientation sensor coupled to said controller for sensing said reference position.

3. A spin control system as in claim 1 wherein each of said first thrust producing means and said second thrust producing means comprises a ducted fan.

4. A spin control system as in claim 2 further comprising an underwater depth sensor coupled to said position/orientation sensor for initiating the sensing of said reference position at a specified underwater depth.

5. A spin control system as in claim 1 further comprising wireless communication means coupled to said controller for remotely controlling operation of said controller.

6. A spin control system for controlling spin of an object about a longitudinal axis of a suspension member attached to the object, said spin control system comprising:
a housing adapted to be coupled to the object at a position thereon that is spaced apart from the longitudinal axis of the suspension member;

first thrust producing means coupled said housing such that, when activated, said first thrust producing means generates thrust in a first direction that is substantially perpendicular to the longitudinal axis of the suspension member;

second thrust producing means coupled to said housing such that, when activated, said second thrust producing means generates thrust in a second direction that is opposite said first direction and substantially perpendicular to the longitudinal axis of the suspension member;

a controller mounted in said housing and coupled to said first thrust producing means and said second thrust producing means for activating at least one of said first thrust producing means and said second thrust producing means to approximately align the object with a reference position; and a sensor coupled to said controller for generating a signal when said sensor is in water wherein, in response to said signal, said controller inhibits activation of said first thrust producing means and said second thrust producing means in water.

7. A spin control system as in claim 6 wherein said housing positions said first thrust producing means and said second thrust producing means approximately the same distance from the longitudinal axis of the suspension member.

8. A spin control system as in claim 6 further comprising a position/orientation sensor mounted in said housing and coupled to said controller for sensing said reference position.

9. A spin control system as in claim 6 wherein each of said first thrust producing means and said second thrust producing means comprises a ducted fan.

10. A spin control system as in claim 8 further comprising an underwater depth sensor coupled to said position/orientation sensor for initiating the sensing of said reference position at a specified underwater depth.

11. A spin control system as in claim 6 further comprising wireless communication means coupled to said controller for remotely controlling operation of said controller.

12. A spin control system for controlling spin of an object about a longitudinal axis of a suspension member attached to the object, said spin control system comprising:

a housing adapted to be coupled to the object to define a mounting region that is spaced apart from the longitudinal axis of the suspension member;

first thrust producing means coupled to said mounting region such that, when activated, said first thrust producing means generates thrust in a first direction that is substantially perpendicular to the longitudinal axis of the suspension member;

second thrust producing means coupled to said mounting region such that, when activated, said second thrust producing means generates thrust in a second direction that is opposite said first direction and substantially perpendicular to the longitudinal axis of the suspension member;

a controller mounted in said housing and coupled to said first thrust producing means and said second thrust producing means for activating at least one of said first thrust producing means and said second thrust producing means to approximately align the object with a reference position;

a sensor coupled to said controller for generating a signal when said sensor is in water wherein, in response to said signal, said controller inhibits activation of said first thrust producing means and said second thrust producing means in water; and a wireless receiver coupled to said controller for receiving wireless signals wherein said controller is responsive to said wireless signals.

13. A spin control system as in claim 12 further comprising a position/orientation sensor mounted in said housing and coupled to said controller for sensing said reference position.

14. A spin control system as in claim 12 wherein each of said first thrust producing means and said second thrust producing means comprises a ducted fan.

15. A spin control system as in claim 13 further comprising an underwater depth sensor coupled to said position/orientation sensor for initiating the sensing of said reference position at a specified underwater depth.

* * * * *